Nov. 25, 1941.  E. V. RIPPINGILLE  2,263,820

METHOD OF MAKING BEARINGS

Filed Oct. 28, 1939

Inventor
Edward V. Rippingille
By
Blackmore, Spencer & Hint
Attorneys

Patented Nov. 25, 1941

2,263,820

UNITED STATES PATENT OFFICE 2,263,820

METHOD OF MAKING BEARINGS

Edward V. Rippingille, Detroit, Mich., assignor to General Motors Corporation, Detroit, Mich., a corporation of Delaware Application October 28, 1939, Serial No. 301,680

2 Claims. (Cl. 29—149.5)

This invention relates to bearing bushings having either internal or external bearing surfaces of anti-friction material, or both. More specifically it relates to floating bearing bushings of steel, with internal and external anti-friction linings which may be embossed and filled with a still softer bearing material of lead or other suitable bearing alloy to provide a bearing which is strong, with high load carrying capacity, and at the same time of minimum thickness and space requirement.

The object of the invention is a bearing bushing of the foregoing type which will be simple and cheap to make.

The above and other objects of the invention will be apparent as the description proceeds.

According to the invention, the bushing may consists of two strips of steel, with anti-friction material bonded to one side thereof and suitably embossed to hold a softer bearing material such as lead, which are spirally wound in opposite directions, tightly upon each other, and welded securely together to form a tube having inner and outer layers of strip material overlaying each other, with the steel side of said strips back to back and the anti-friction surfaces to the inside and outside of the tube, the embossing being subsequently filled with the softer anti-friction material such as lead or the like.

The drawing shows the preferred form of the invention and the method of making thereof.

Figure 1:
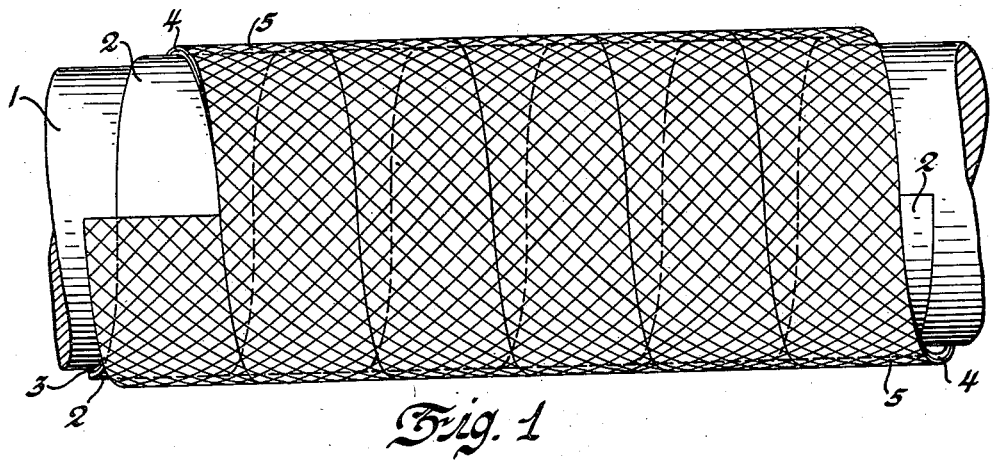
Fig. 1 is a view showing the manner in which the strip material is spirally wound upon a mandrel.
Figure 2:
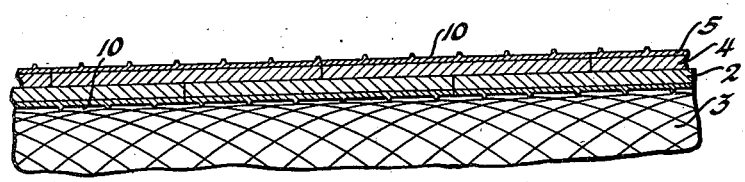
Fig. 2 is an enlarged sectional view of a part of Fig. 1.

The sheet material from which the bearing bushing is constructed is commercially obtainable, and may be a bi-metallic strip of copper and steel, or so called copper clad steel, consisting of a sheet of copper bonded to a sheet of steel. The copper surface of the sheet is embossed in any suitable way, to provide depressions which are subsequently filled with babbitt of a softer metal such as lead or the like.

A strip 2, of the sheet material, is cut to a suitable width, and spirally wound, tightly on a mandrel 1 of any convenient length, with the embossed copper surface 3 of the strip against the mandrel and with the edges of the convolutions of the strip abutting one another so that there is no space left between them. The strip is held securely on the mandrel in any suitable way, while a similar strip 4 is spirally wound in an opposite direction over the strip 2 with the embossed copper surface 5 of the strip 4 to the outside, the steel sides of said strips being back to back.

While still tightly wrapped on the mandrel the strips are secured together as by shot resistance welding, in well known manner, electrode contact for welding being made at selected points on the exterior copper surface of the outer strip. The greater electrical resistance of the steel than the copper of the strips insures that with a high welding current density, the steel of one strip will be welded to the steel of the other, without melting of their copper surfaces.

Figure 3:
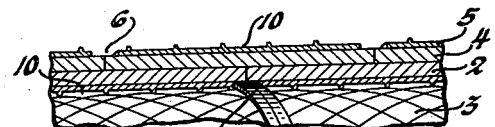
Fig. 3 is a view, similar to Fig. 2, of a modified construction.

Alternatively, and as shown in Fig. 3, a narrow strip of copper may be removed from the edges of the strips before winding so that the abutments of the convolutions will be bare of copper as shown at 6 and 7. Electrode contact for welding can then be made directly on the steel of the strips.

Figure 4:
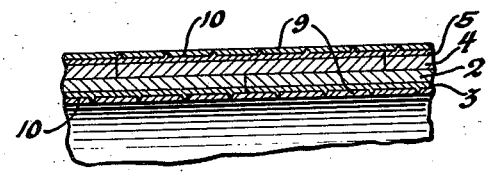
Fig. 4 is an enlarged sectional view similar to Fig. 2 with the depressions in the embossed surfaces filled with babbitt.

After welding, the tube formed of the spirally wound strips is removed from the mandrel and a high lead babbitt 9 is cast into the embossed depressions 10 as shown in Fig. 4.

Figure 5:
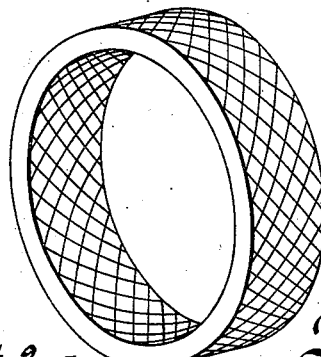
Fig. 5 is a perspective view of a completed bushing.
Figure 6:
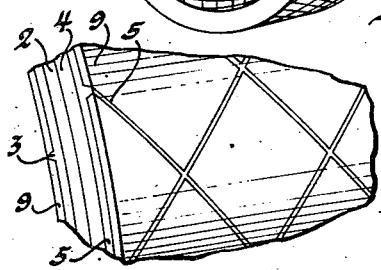
Fig. 6 is an enlarged view of a part of Fig. 5.

Sections of any required length may be cut off the tube formed of the spirally wound strip, and may be machined to size to produce floating bushings of the kind shown in Fig. 5.

I claim:

1. The method of making floating bearing bushings from strip material of steel having copper bonded to one side thereof, which consists in suitably embossing the copper side of the strip material, spirally winding a strip of said embossed material tightly upon a mandrel, with the copper side of said strip adjacent thereto, and with its edges in abutting relationship, spirally winding another strip of said embossed material tightly and in an opposite direction over the first of said strips, steel to steel with the copper side to the outside, welding said strips together, removing the tubular assembly so formed from the mandrel, filling the embossing with a suitable bearing material, cutting to length and machining to size.

2. The method of making floating bearing bushings from bi-metallic strip material of steel on one side and a suitable anti-friction metal on the other, which consists in embossing said anti-friction surface, removing a narrow strip of the anti-friction metal from the edges of the strips, spirally winding a strip of said material tightly upon a mandrel with the embossed anti-friction surface adjacent thereto, spirally winding another strip of said material tightly in an opposite direction over the first of said strips, with the anti-friction surface to the outside, securing said strips together by electric resistance welding with electrode contact directly on the steel of the strips at the edges from which the anti-friction metal has been removed, removing the tubular assembly so formed from the mandrel, filling the embossed depressions with a softer anti-friction material, cutting to length and machining to size.

EDWARD V. RIPPINGILLE.